United States Patent
Murata

(10) Patent No.: US 11,597,488 B2
(45) Date of Patent: Mar. 7, 2023

(54) SHIP MANEUVERING SYSTEM, SHIP, AND SHIP MANEUVERING METHOD

(71) Applicant: MITSUI E&S SHIPBUILDING CO., LTD., Tokyo (JP)

(72) Inventor: Koh Murata, Tamano (JP)

(73) Assignee: Mitsui E&S Shipbuilding Co., Ltd., Tokyo (JP)

( * ) Notice: Subject to any disclaimer, the term of this patent is extended or adjusted under 35 U.S.C. 154(b) by 928 days.

(21) Appl. No.: 16/346,630

(22) PCT Filed: Nov. 30, 2017

(86) PCT No.: PCT/JP2017/043028
§ 371 (c)(1),
(2) Date: May 1, 2019

(87) PCT Pub. No.: WO2018/101395
PCT Pub. Date: Jun. 7, 2018

(65) Prior Publication Data
US 2020/0062366 A1    Feb. 27, 2020

(30) Foreign Application Priority Data

Nov. 30, 2016  (JP) .............................. JP2016-232223

(51) Int. Cl.
*B63H 25/38*    (2006.01)
*B63H 25/42*    (2006.01)
(Continued)

(52) U.S. Cl.
CPC ............. *B63H 25/38* (2013.01); *B63H 25/42* (2013.01); *G05D 1/0206* (2013.01); *B63H 2025/066* (2013.01)

(58) Field of Classification Search
CPC .. B63H 25/38; B63H 25/42; B63H 2025/066; B63H 25/06; B63H 25/02; B63H 25/24; G05D 1/0206
See application file for complete search history.

(56) References Cited

U.S. PATENT DOCUMENTS 5,488,919 A * 2/1996 Ferreiro .................. B63B 39/06
114/163
7,006,905 B2 * 2/2006 Hamamatsu ........... B63H 25/02
701/530

(Continued)

FOREIGN PATENT DOCUMENTS

JP          S62-8899 A      1/1987
JP          S62-55292 A     3/1987
(Continued)

*Primary Examiner* — Anthony D Wiest
(74) *Attorney, Agent, or Firm* — Carrier Shende & Associates, P.C.; Joseph P. Carrier; Anne G. Sabourin

(57) ABSTRACT

A maneuvering system for a ship provided with, in the stern, a port-side propulsion system, and a starboard-side propulsion system. For controlling the system, a forward or backward force of the ship 1 is obtained by the difference between the forward and backward propulsion forces of the propulsion systems and a first turning moment in a turning direction of the ship generated by the propulsion forces is offset by a second turning moment in the turning direction of the ship generated by steering a port-side rudder, whereby the ship moves in a transversal manner toward its starboard side while rotation of the ship is avoided. A high degree of maneuverability is thereby achieved with a relatively simple maneuvering operation.

10 Claims, 13 Drawing Sheets

(51) Int. Cl.
    *G05D 1/02*      (2020.01)
    *B63H 25/06*     (2006.01)

(56)        References Cited

U.S. PATENT DOCUMENTS 9,690,295  B1 *  6/2017  Abellera  ............... B63H 25/02
2009/0197486  A1 *  8/2009  Szilagyi  ............... B63H 25/02
                                                           440/53
2011/0172858  A1 *  7/2011  Gustin    ............... B63H 21/213
                                                           701/21

FOREIGN PATENT DOCUMENTS

JP          S62-55293   A    3/1987
JP          2000-302098 A   10/2000
JP          2002-234495 A    8/2002
JP          2008-174173 A    7/2008

* cited by examiner

SHIP MANEUVERING SYSTEM, SHIP, AND SHIP MANEUVERING METHOD

TECHNICAL FIELD

The present invention relates to a ship maneuvering system, a ship, and a ship maneuvering method for a ship having, at its stern, two propulsion systems, namely a port-side propulsion system including a port-side propulsion device and a port-side rudder, and a starboard-side propulsion system including a starboard-side propulsion device and a starboard-side rudder.

BACKGROUND ART

For a ship such as a marine research ship that performs deep seabed investigation or a special ship that performs seabed drilling while staying at a constant position, it is necessary to maintain the heading and position of the ship without being drifted by waves, winds, or tides, and there has been developed a dynamic positioning system for reducing the burden on the ship operator.

For a ship to be used in the dynamic positioning system, there is proposed as described in JP2000-302098A, for example, an automatic direction setting method that controls the ship by using a ship having two-axis propellers and two rudders at its stern combined with the bow thruster at its bow, or a ship having the stern thruster at its stern and a one-axis propeller and a rudder combined with the bow thruster at its bow to distribute the propulsion force on the basis of forward and backward control force commands, lateral control force commands, and turning force commands.

In addition, as described in JP2009-241738A, for example, there is also proposed a dynamic positioning system for a one-axis propeller, one-rudder and bow thruster ship, which is a ship having a tunnel-type bow thruster and a propeller together with a flap rudder or a special rudder capable of steering at a large-angle, and performs control in various modes such as a dynamic positioning mode, a standby mode, a JOY mode or an auto heading control mode, using a joy-stick or a turning-round dial. Furthermore, there is also proposed a dynamic positioning control device for a twin-screw twin-rudder ship having two side thrusters respectively provided at its bow and stern, as described in JP2010-105551A, for example.

However, in the aforementioned ships, the bow thruster provided at the bow, and therefore the aforementioned technique is not available for a ship without a bow thruster and, even when the ship has a bow thruster, observation devices such as an acoustic device provided in the vicinity of the bow may be affected by using the bow thruster, which results in a problem that the bow thruster is not available even when dynamic positioning is needed in a situation under which use of the bow thruster is not desirable during observation.

On the other hand, to allow for changing a target value of maneuvering the ship with easy operation, as described in JP1997-104397A, for example, a target value of the ship direction or the ship position may be changed by using a joy-stick (joy-stick lever), a turning-round dial (turning dial).

CITATION LIST

Patent Literature

Patent document 1: JP2000-302098A
Patent document 2: JP2009-241738A
Patent document 3: JP2010-105551A
Patent document 4: JP1997-104397A

SUMMARY OF INVENTION

Technical Problem

It is an object of the present invention, which has been made in view of the aforementioned situation, to provide a ship maneuvering system, a ship, and a ship maneuvering method capable of exhibiting a high maneuverability by a relatively easy maneuvering operation, in a maneuvering system of a ship having two propulsion systems of a port-side propulsion system including a port-side propulsion device and a port-side rudder and a starboard-side propulsion system including a starboard-side propulsion device and a starboard-side rudder, at its stern.

Solution to Problem

A ship maneuvering system for achieving the aforementioned object is a maneuvering system of a ship having two propulsion systems of a port-side propulsion system including a port-side propulsion device and a port-side rudder and a starboard-side propulsion system including a starboard-side propulsion device and a starboard-side rudder, at its stern, the ship maneuvering system comprising a maneuvering control device configured to perform at least one of transverse control and pivot turning heading control, wherein said transverse control carries out to obtain propulsive force in the longitudinal direction of the ship due to a difference between a backward force of the propulsion system on one broadside and a forward force of the propulsion system on another broadside, and move the ship to the direction of said one broadside, while avoiding turning round of the ship, by cancelling a first turning moment in a turning direction of the ship generated by a backward force of the propulsion system of said one broadside and a forward force of the propulsion system on another broadside, by a second turning moment in a turning direction of the ship generated by steering the rudder of the propulsion system on said another broadside; and wherein said pivot turning heading control carries out to zero out a propulsive force in the longitudinal direction of the ship due to cancelling a backward force of the propulsion system on one broadside by a forward force of the propulsion system on another broadside, and also obtain a turning-round moment of the ship in a turning direction by adding a second turning moment in a turning direction of the ship generated by steering the rudder of the propulsion system on said one broadside to a first turning moment in the turning direction of the ship generated by the backward force of the propulsion system of said one broadside and a forward force of the propulsion system on said another broadside, so as to cause the bow of the ship to be turn heading on the spot to the direction of said another broadside. Here, "steering" refers to turning the rudder to starboard or port. Here, "transverse" refers to moving in a lateral direction, in a diagonally forward direction, or a diagonally backward direction without changing the heading of the ship, in other words, without the ship turning round. In addition, the port-side propulsion device and the starboard-side propulsion device may include fixed-pitch propellers, variable-pitch propellers, or the like.

According to the aforementioned configuration, it is only necessary to steer the rudder on one or the other broadside and keep the state of counter rudder of the rudder which is different from the former rudder to perform transverse and pivot turning heading round, and thus parameters required for control turn out to be the propulsion forces of the propulsion systems on both broadsides, and the rudder angle of one rudder, whereby it becomes possible to maneuver the ship by relatively simple control. As a result, even when the ship does not have a bow thruster, a relatively simple maneuvering allows for transverse without turning round of the ship, or pivot turning heading round with neither forward nor backward advancing, which realizes a significantly improved maneuverability, and makes automatic maneuvering for dynamic positioning or position holding within a certain area significantly easy.

In the aforementioned ship maneuvering system, it is possible to perform transverse control in port-side and transverse control in starboard-side by a relatively easy maneuvering operation, provided that the maneuvering control device is configured to perform transverse control in port-side and transverse control in starboard-side, wherein said transverse control in port-side carries out to equalize a magnitude of a port-side backward force generated by said port-side propulsion system and a magnitude of a starboard-side forward force generated by said starboard-side propulsion system, and also cancel a first turning moment generated by a port-side backward force and a starboard-side forward force by a second turning moment generated by steering said starboard-side rudder to starboard, so as to cause the ship to translate in the port-side direction by a lateral direction force generated by steering said starboard-side rudder to starboard; and wherein said transverse control in starboard-side carries out to equalize a magnitude of a port-side forward force generated by said port-side propulsion system and a magnitude of a starboard-side backward force generated by said starboard-side propulsion system, and also cancel a first turning moment generated by a port-side forward force and a starboard-side backward force by a second turning moment generated by steering said port-side rudder to port, so as to cause the ship to translate in the starboard-side direction by a lateral direction force generated by steering said port-side rudder to port.

In the aforementioned ship maneuvering system, it is possible to perform diagonally-forward control in port-side and diagonally-forward control in starboard-side by a relatively easy maneuvering operation, provided that the maneuvering control device is configured to perform diagonally-forward control in port-side and diagonally-forward control in starboard-side, wherein said diagonally-forward control in port-side carries out to make a magnitude of a starboard-side forward force generated by said starboard-side propulsion system larger than a magnitude of a port-side backward force generated by said port-side propulsion system, and also cancel a first turning moment generated by said port-side backward force and said starboard-side forward force by a second turning moment generated by steering said starboard-side rudder to starboard, so as to cause the ship to transverse diagonally forward in port-side by a lateral direction force generated by steering said starboard-side rudder to starboard; and wherein said diagonally-forward control in starboard-side carries out to make a magnitude of a port-side forward force generated by said port-side propulsion system larger than a magnitude of a starboard-side backward force generated by said starboard-side propulsion system, and also cancel a first turning moment generated by a port-side forward force and a starboard-side backward force by a second turning moment generated by steering said port-side rudder to port, so as to cause the ship to transverse diagonally forward in starboard-side by a lateral direction force generated by steering said port-side rudder to port.

In the aforementioned ship maneuvering system, it is possible to perform diagonally-forward control in port-side and diagonally-forward control in starboard-side by a relatively easy maneuvering operation, provided that the maneuvering control device is configured to perform diagonally-forward control in port-side and diagonally-forward control in starboard-side, wherein said diagonally-forward control in port-side carried out to make a magnitude of a starboard-side forward force generated by said starboard-side propulsion system smaller than a magnitude of a port-side backward force generated by said port-side propulsion system, and also cancel a first turning moment generated by a port-side backward force and a starboard-side forward force by a second turning moment generated by steering said starboard-side rudder to starboard, so as to cause the ship to transverse diagonally backward in port-side by a lateral direction force generated by steering said starboard-side rudder to starboard; and wherein said diagonally-forward control in starboard-side carried out to make a magnitude of a port-side forward force generated by said port-side propulsion system smaller than a magnitude of a starboard-side backward force generated by said starboard-side propulsion system, and also cancel a first turning moment generated by a port-side forward force and a starboard-side backward force by a second turning moment generated by steering said port-side rudder to port, so as to cause the ship to transverse diagonally backward in starboard-side by a lateral direction force generated by steering said port-side rudder to port.

In the aforementioned ship maneuvering system, it is possible to perform pivot turning heading control in counterclockwise and pivot turning heading control in clockwise by a relatively easy maneuvering operation, provided that the maneuvering control device is configured to perform pivot turning heading control in counterclockwise and pivot turning heading control in clockwise, wherein said pivot turning heading control in counterclockwise carries out to equalize a magnitude of a port-side backward force generated by said port-side propulsion system and a magnitude of a starboard-side forward force generated by said starboard-side propulsion system, and also adds a second turning moment generated by steering said starboard-side rudder to port to a first turning moment generated by a port-side backward force and a starboard-side forward force, so as to cause the ship to turn around counterclockwise when seen from above; and wherein said pivot turning heading control in clockwise carries out to equalize a magnitude of a port-side forward force generated by said port-side propulsion system and a magnitude of a starboard-side backward force generated by said starboard-side propulsion system, and also adds a second turning moment generated by steering said port-side rudder to starboard to a first turning moment generated by a port-side backward force and a starboard-side forward force, so as to cause the ship to turn around clockwise when seen from above.

In the aforementioned ship maneuvering system, it is possible to easily unberthing from a pier or steer away from a ship, or to easily berthing to a pier or approaching a ship from the distance away from the target of a pier or a ship, provided that the maneuvering control device has an automatic berthing/unberthing control mode which automatically performs one or all of; unberthing control in port-side to perform unberthing or steering away from a ship at the port-side; unberthing control in starboard-side to perform unberthing or steering away from a ship at the starboard-side; berthing control in port-side to perform berthing or approaching a ship at the port-side; or berthing control in starboard-side to perform berthing or approaching a ship at the starboard-side, using at least one of said transverse control or said pivot turning heading control.

In the aforementioned ship maneuvering system, it becomes possible to perform various ship maneuvering by a relatively simple input of maneuvering operation to a movement information input unit which may be in a form of a very convenient joystick or the like, and a turning information input unit which may be in a form of a dial or the like, when the aforementioned ship maneuvering system provides with a movement information input unit which is a joy-stick type and a turning information input unit which is a dial type, as input devices for ship maneuvering.

In the aforementioned ship maneuvering system, it is possible to easily perform various ship maneuvering by a relatively simple input of maneuvering operation to the movement information input unit and the turning information input unit, provided that the maneuvering control device is configured to: in a case where an input to said turning information input unit is neutral; cause the ship to move in a port-side direction without turning round when an input to said movement information input unit indicates the port-side direction; cause the ship to move diagonally forward in port-side without turning round when an input to said movement information input unit indicates diagonally forward in port-side; cause the ship to move diagonally backward in port-side without turning round when an input to said movement information input unit indicates diagonally backward in port-side; cause the ship to move in a starboard-side direction without turning round when an input to said movement information input unit indicates the starboard-side direction; cause the ship to move diagonally forward in starboard-side without turning round when an input to said movement information input unit indicates diagonally forward in starboard-side; and cause the ship to move diagonally backward in starboard-side without turning round when an input to said movement information input unit indicates diagonally backward in starboard-side.

In the aforementioned ship maneuvering system, it is possible to easily perform various ship maneuvering by a relatively simple input of maneuvering operation to the movement information input unit and the turning information input unit, provided that the maneuvering control device is configured to: in a case where an input to said movement information input unit is neutral, cause the ship to perform pivot turning heading in clockwise round without forward or backward movement when an input to said turning information input unit indicates the starboard-side direction; and cause the ship to perform pivot turning heading in counterclockwise round without forward or backward movement when an input to said turning information input unit indicates the port-side direction.

Accordingly, a ship for achieving the aforementioned object is characterized in comprising the aforementioned ship maneuvering system, and is capable of exhibiting the effect of the aforementioned ship maneuvering system.

In addition, a maneuvering method of a ship for achieving the aforementioned object having two propulsion systems of a port-side propulsion system including a port-side propulsion device and a port-side rudder and a starboard-side propulsion system including a starboard-side propulsion device and a starboard-side rudder, at its stern, the method performing at least one of obtaining a propulsive force in the longitudinal direction of the ship due to a difference between a backward force of the propulsion system on one broadside and a forward force of the propulsion system on another broadside, and moving the ship to the direction of said one broadside, while avoiding turning round of the ship, by cancelling a first turning moment in a turning direction of the ship generated by a backward force of the propulsion system of said one broadside and a forward force of the propulsion system on another broadside, by a second turning moment in a turning direction of the ship generated by steering the rudder of the propulsion system on said another broadside; and zeroing out a propulsive force in the longitudinal direction of the ship due to cancelling a backward force of the propulsion system on one broadside by a forward force of the propulsion system on another broadside, and also obtaining a turning-round moment of the ship in a turning direction by adding a second turning moment in a turning direction of the ship generated by steering the rudder of the propulsion system on said one broadside to a first turning moment in the turning direction of the ship generated by the backward force of the propulsion system of said one broadside and a forward force of the propulsion system on said another broadside, so as to cause the bow of the ship to be turn heading on the spot to the direction of said another broadside.

According to the method, even when the ship does not have a bow thruster, a relatively simple maneuvering allows for transverse without turning round of the ship, or pivot turning heading round with neither forward nor backward advancing, which realizes a significantly improved maneuverability, and makes automatic maneuvering for dynamic positioning or position holding within a certain area significantly easy.

Additionally, once the aforementioned various control allows maneuvering operation, it becomes possible to perform, even in an ocean area with wave, wind, or tide, by the operation of the movement information input unit and the turning information input unit, auto DP mode for automatically staying in a position or an area specified on the sea, ship maneuvering in designated area for keeping the ship position within a certain distance from a specified spot where observation instruments or the like are installed, ship maneuvering in designated distance for following underwater observation instruments while keeping a certain distance therefrom, parallel navigation that allows a plurality of ships to navigate in parallel to perform observation or fishing while keeping a certain distance between each other, berthing/unberthing ship maneuvering for berthing and unberthing without the help of a tugboat or the like when a ship berths to a pier or unberths from a pier, approach/leave ship maneuvering for approaching to or leaving from a mothership or the like on the sea, or the like, which allows for significantly reducing the burden of a ship operator in a situation where such ship maneuvering is required.

Advantageous Effects of Invention

According to the ship maneuvering system, the ship, and the ship maneuvering method of the present invention, a high maneuverability is exhibited by a relatively easy maneuvering operation in a maneuvering system of a ship having two propulsion systems of a port-side propulsion system including a port-side propulsion device and a port-side rudder and a starboard-side propulsion system including a starboard-side propulsion device and a starboard-side rudder, at its stern.

DESCRIPTION OF EMBODIMENTS

In the following, a ship maneuvering system, a ship and a ship maneuvering method of embodiments according to the present invention will be described, referring to the accompanying drawings. Although a ship which does not have a bow thruster at its bow is taken as example here, the present invention is not necessarily limited to a ship with a bow thruster, but a ship with a bow thruster may also be used, because even when the ship has a bow thruster at its bow, the bow thruster may also be used for ship maneuvering in a case where use of the bow thruster is prohibited when using an underwater acoustic instrument or the like. Although the ship maneuvering described here does not use a bow thruster, maneuvering performance may be further improved by using a bow thruster together.

In addition, "steering" as used herein refers to, assuming the angle of the counter rudder which does not generate a turning-round force of the ship to be zero, changing the rudder angle from the zero position to a position where the rudder is turned to starboard, which is a manner of steering that generates a clockwise turning force of the ship when seen from above, or where the rudder is turned to port, which is a manner of steering that generates a counterclockwise turning force of the ship when seen from above.

Furthermore, "transverse" as used here refers to a movement of the ship in a lateral direction, a diagonally forward direction, or a diagonally backward direction without changing its heading, in other words, without veering. In addition, "forward force" and "backward force" are respectively intended to include the case of "forward force is zero" and "backward force is zero".

Figure 1:
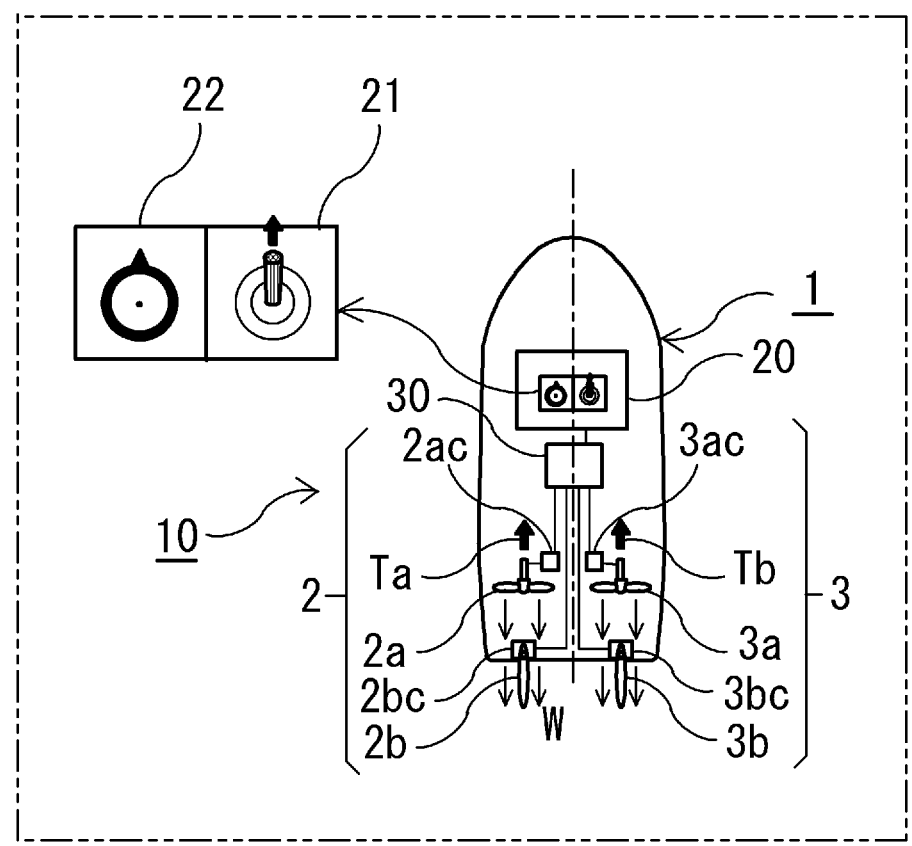
FIG. 1 schematically illustrates a ship maneuvering system of an embodiment of the present invention and a configuration of a ship.

As illustrated in FIG. 1, a ship 1 has two propulsion systems 2 and 3 of a port-side propulsion system 2 including a port-side propulsion device 2a and a port-side rudder 2b and a starboard-side propulsion system 3 including a starboard-side propulsion device 3a and a starboard-side rudder 3b, at its stern. Both the port-side propulsion device 2a and the starboard-side propulsion device 3a are in a form of propellers. Although the propeller may be a fixed-pitch propeller, a variable-pitch propeller is more preferred since it facilitates change of propulsion force. In addition, there are provided an input device 20 and a maneuvering control device 30. The input device 20 includes a movement information input unit 21 in a form of joy-stick and a turning information input unit 22 in a form of a dial.

In addition, the maneuvering control device 30 inputs position information and speed information of the ship 1 from a GPS device or log and the like, heading information from a gyro device, information from an anemometer, information from an underwater positioning device, information from a radar, information from a distance measuring device or a ranging communication device, besides data indicating inclination direction (maneuvering direction: ship movement direction) and degree of inclination angle of the joy-stick in the inclination direction from the information input unit 21, and data indicating turning direction of the dial and dial angle from the turning information input unit 22, and outputs, to control devices 2ac and 3ac of respective variable-pitch propellers, selection between forward or backward performed respectively by the port-side propulsion device 2a and the starboard-side propulsion device 3a, and command of the magnitude of propulsion force to be generated, and also outputs selection between starboard and port for the port-side rudder 2b and the starboard-side rudder 3b, as well as command of the degree of the rudder angle to respective steering devices 2bc and 3bc.

In other words, with the ship maneuvering system 10, when a ship operator operates the movement information input unit 21 and the turning information input unit 22 using the input device 20 to maneuver the ship, the maneuvering control device 30 receives data of inclination direction and inclination angle from the movement information input unit 21 and data of turning direction of the dial and dial angle from the turning information input unit 22, integrally controls the propulsion devices 2a and 3a and the rudders 2b and 3b to perform ship maneuvering such as forward, backward, transverse, diagonally forward transverse, diagonally backward transverse or pivot turning heading round.

Figure 2:
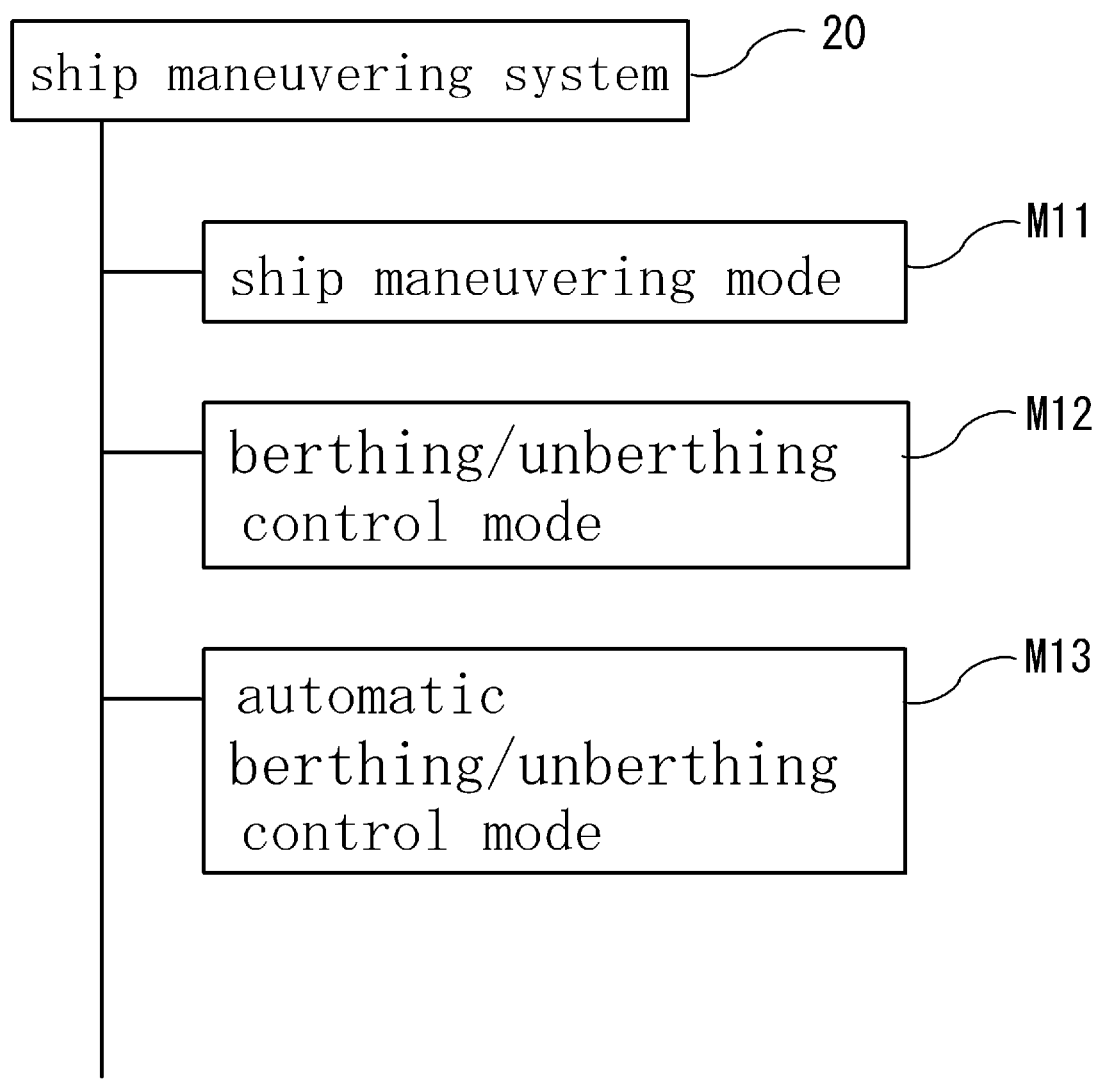
FIG. 2 illustrates a configuration of a mode of the ship maneuvering system of an embodiment of the present invention.

The ship maneuvering system 10 has a control means as described below. In other words, as illustrated in FIG. 2, there are provided a berthing/unberthing control mode M12 and an automatic berthing/unberthing control mode M13 besides the commonly known ship maneuvering mode M11.

In the "ship maneuvering mode M11" and the "berthing/unberthing control mode M12, automatic berthing/unberthing control mode M13", the meanings on ship maneuvering of the data of inclination direction and inclination angle from the movement information input unit 21 and the meanings on ship maneuvering of the data of turning direction of the dial and dial angle from the turning information input unit 22 are made different and the meanings are intended to mean input data suitable for respective control modes. Accordingly, increase of the number of data input units may be avoided.

Here, in the "transverse control, diagonal transverse control" in the "berthing/unberthing control mode M12, automatic berthing/unberthing control mode M13", the inclination direction of the movement information input unit 21 means the direction in which the ship 1 is desired to be translated, the inclination angle of the movement information input unit 21 means the magnitude of the force generated for the transversal movement, and the larger the inclination angle is, the larger the force to be generated for the transversal movement becomes.

In addition, in the "pivot turning heading control", the turning direction of the dial of the turning information input unit 22 means the turning direction of the ship 1, the dial angle of the turning information input unit 22 means the degree of the turning moment to be generated for the turning, and the larger the dial angle is, the larger the turning moment to be generated for the turning becomes.

Figure 3:
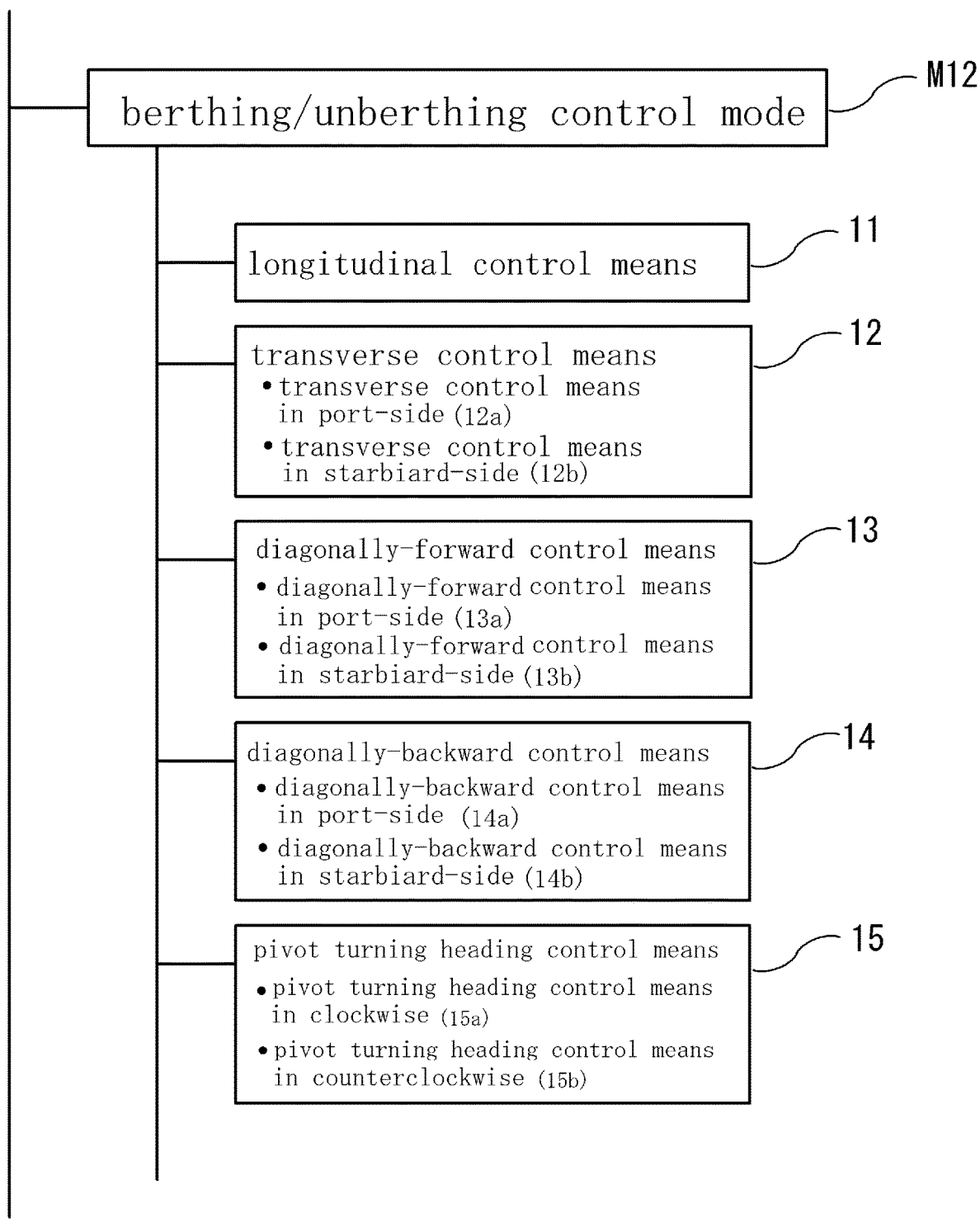
FIG. 3 illustrates a configuration of a berthing/unberthing control mode of the ship maneuvering system.

Additionally, as illustrated in FIG. 3, there are provided in the berthing/unberthing control mode M12, a longitudinal control means 11, a transverse control means 12 including a transverse control means in port-side 12a and a transverse control means in starboard-side 12b, a diagonally-forward control means 13 including a diagonally-forward control means in port-side 13a and a diagonally-forward control means in starboard-side 13b, a diagonally-backward control means 14 including a diagonally-backward control means in port-side 14a and a diagonally-backward control means in starboard 14b, a pivot turning heading control means 15 including a pivot turning heading control means in clockwise 15a and a pivot turning heading control means in counterclockwise 15b, or the like.

Figure 5:
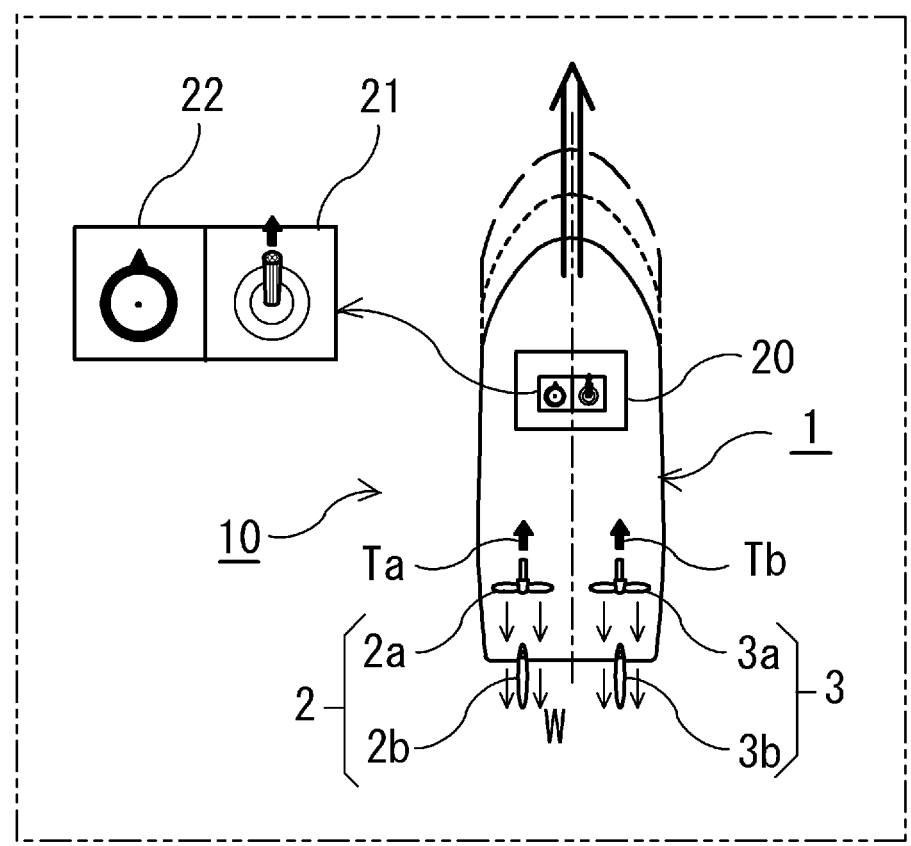
FIG. 5 is an explanatory diagram of longitudinal control.

The longitudinal control means 11 of the berthing/unberthing control mode M12 is means for performing longitudinal control by performing control of zeroing out both rudder angles of the port-side rudder 2b and the starboard-side rudder 3b when the inclination direction of the movement information input unit 21 is a forward direction and the rudder angle of the turning information input unit 22 is zero, as illustrated in FIG. 5, and performing control of causing the port-side propulsion device 2a and the starboard-side propulsion device 3a to generate a same forward force, and causing both of the port-side propulsion system 2 and the starboard-side propulsion system 3 to generate a forward force Fx of same forward forces Ta and Tb. The larger the inclination angle data from the movement information input unit 21 is, the larger the magnitude of the forward force Fx is set. In this case, water current W generated by the port-side propulsion device 2a and the starboard-side propulsion device 3a flows along the rudder surface of the port-side rudder 2b and the starboard-side rudder 3b, whereby no rudder force is generated in the lateral direction.

Note that, strictly speaking, the control of zeroing out the rudder angle dose not means the control making the rudder angle zero with respect the fore-aft direction of the ship 1. Generally, the angle of the rudder becomes the angle of counter rudder so that the ship 1 advances longitudinal, then the angle of the counter rudder is set to zero of the rudder angle.

Figure 6:
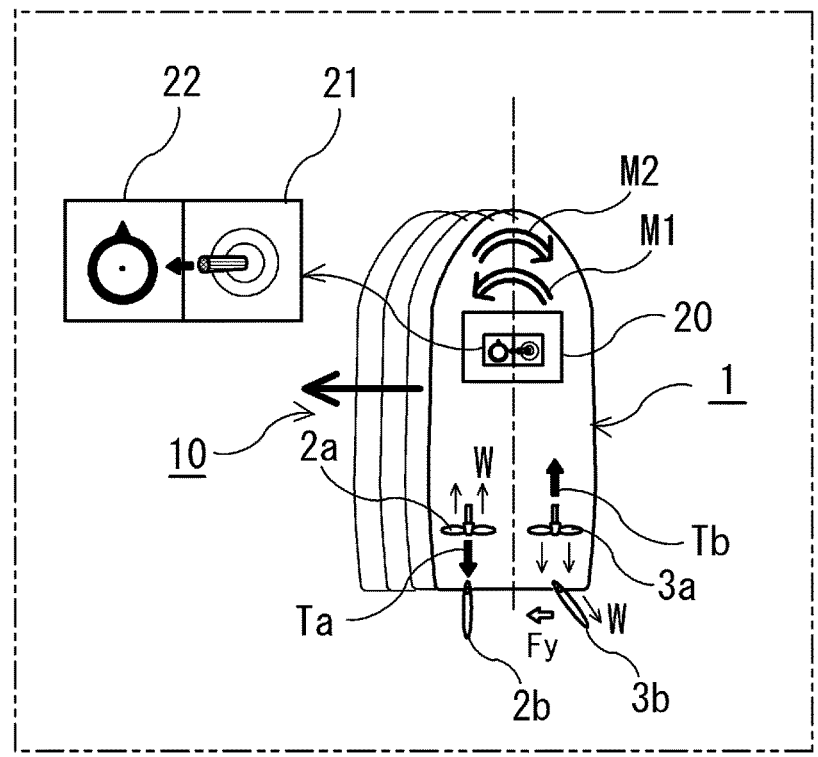
FIG. 6 is an explanatory diagram of transverse control in port-side.

Additionally, in the transverse control means 12, the transverse control means in port-side 12a equalizes the magnitude of a port-side backward force Ta generated by a port-side propulsion system 2 and the magnitude of a starboard-side forward force Ta generated by the starboard-side propulsion system 3 when the inclination direction of the movement information input unit 21 is the port-side direction and the rudder angle of the turning information input unit 22 is zero (neutral), as illustrated in FIG. 6.

At the same time, transverse control in port-side is performed, which cancels a first turning moment M1 generated by the port-side backward force Ta and the starboard-side forward force Tb by a second turning moment M2 generated by steering the starboard-side rudder 3b to starboard, and causes the ship 1 to translate in the port-side direction by a lateral direction force Fy generated by steering the starboard-side rudder 3b to starboard. In this case, the water current W generated by the starboard-side propulsion device 3a hits the rudder surface of the starboard-side rudder 3b which has been turned to starboard, and generates a rudder force having the component Fy in the port-side direction. The larger the inclination angle data from the movement information input unit 21 is, the larger the magnitude of the lateral direction force Fy is set.

Figure 7:
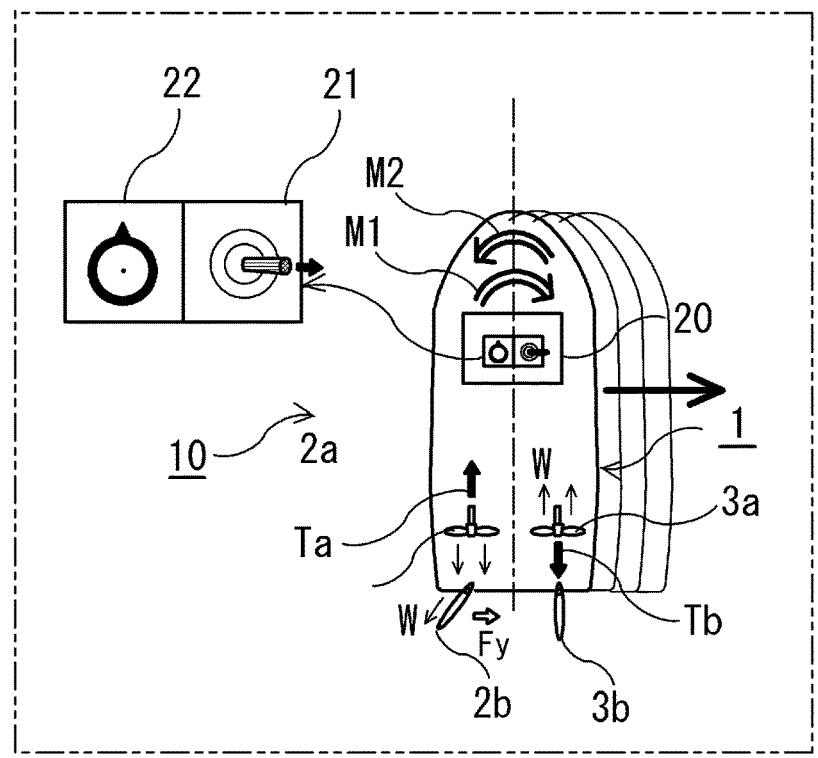
FIG. 7 is an explanatory diagram of transverse control in starboard-side.

In addition, the transverse control means in starboard-side 12b equalizes the magnitude of a port-side forward force Ta generated by a port-side propulsion system 2 and the magnitude of a starboard-side backward force Tb generated by the starboard-side propulsion system 3 when the inclination direction of the movement information input unit 21 is the starboard-side direction and the rudder angle of the turning information input unit 22 is zero (neutral), as illustrated in FIG. 7.

At the same time, transverse control in starboard-side is performed, which cancels the first turning moment M1 generated by the port-side forward force Ta and the starboard-side backward force Tb by the second turning moment M2 generated by steering the port-side rudder 2b to port, and causes the ship 1 to translate in the starboard-side direction by a lateral direction force Fy generated by steering the port-side rudder 2b to port. In this case, the water current W generated by a port-side propulsion device 2a hits the rudder surface of the port-side rudder 2b which has been turned to port, and generates a rudder force having the component Fy in the starboard-side direction. The larger the inclination angle data from the movement information input unit 21 is, the larger the magnitude of the lateral direction force Fy is set.

Figure 8:
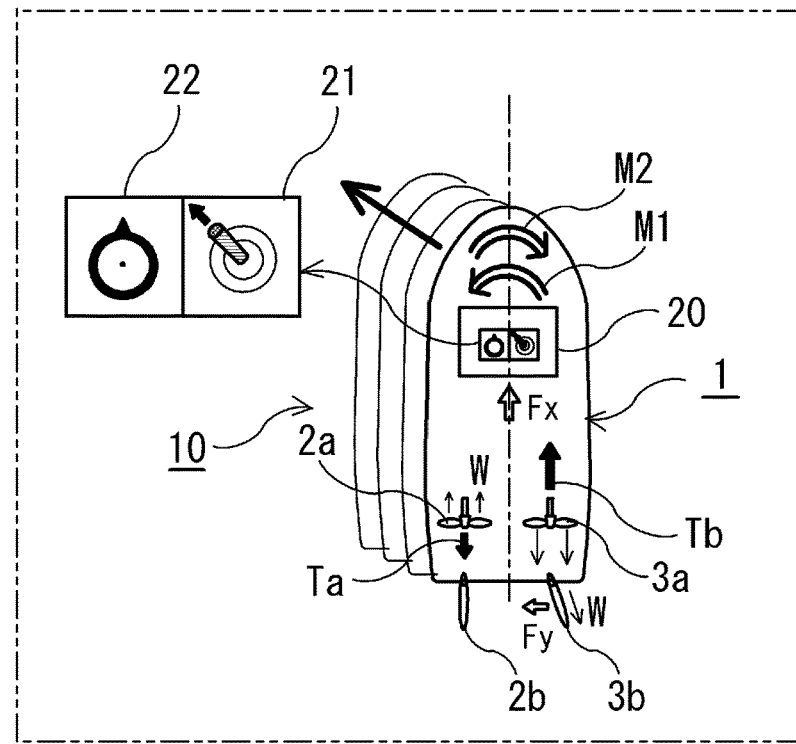
FIG. 8 is an explanatory diagram of diagonally-forward control in port-side.

Additionally, in the diagonally-forward control means 13, the diagonally-forward control means in port-side 13a makes the magnitude of a starboard-side forward force Tb generated by the starboard-side propulsion system 3 larger than a magnitude of a port-side backward force Ta generated by a port-side propulsion system 2 when the inclination direction of the movement information input unit 21 is a diagonally-forward direction in port-side and the rudder angle of the turning information input unit 22 is zero (neutral), as illustrated in FIG. 8. Accordingly, a forward force Fx in the travel direction of the ship 1 is obtained. The larger the inclination angle data from the movement information input unit 21 is, the larger the magnitude of the forward force Fx is set.

At the same time, the first turning moment M1 generated by the port-side backward force Ta and the starboard-side forward force Tb is canceled by the second turning moment M2 generated by steering the starboard-side rudder 3b to starboard, and a lateral direction force Fy is obtained by the lateral direction force Fy generated by steering the starboard-side rudder 3b to starboard. Diagonally-forward control in port-side is performed by combining the lateral direction force Fy and the forward force Fx, which causes the ship 1 to transverse diagonally forward in port-side. In this case, the water current W generated by the starboard-side propulsion device 3a hits the rudder surface of the starboard-side rudder 3b which has been steered to starboard, and generates the rudder force having the component Fy in the port-side direction.

Figure 9:
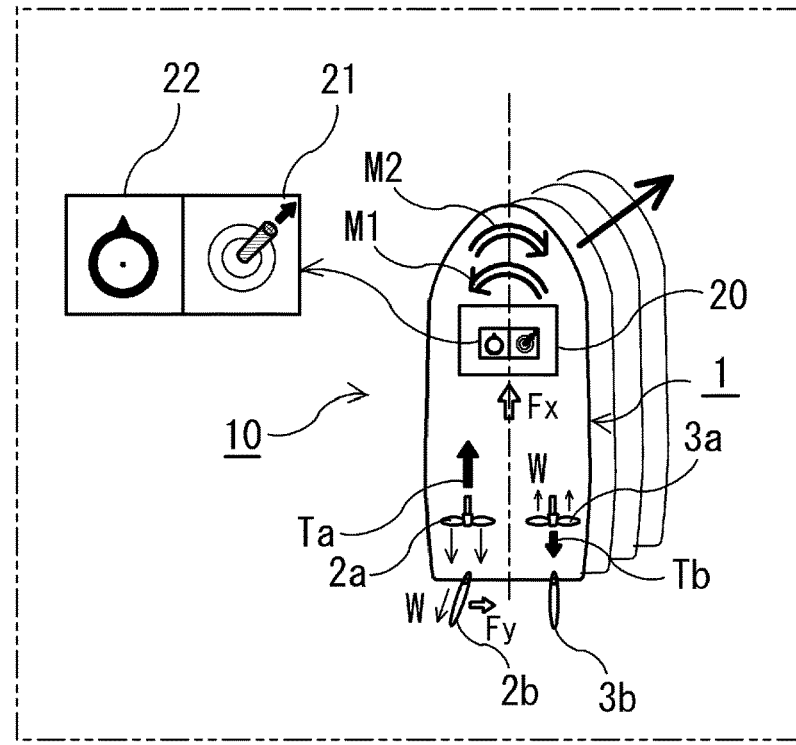
FIG. 9 is an explanatory diagram of diagonally-forward control in starboard-side.

In addition, the diagonally-forward control means in starboard-side 13b makes the magnitude of the port-side forward force Ta generated by a port-side propulsion system 2 larger than a magnitude of a starboard-side backward force Tb generated by the starboard-side propulsion system 3 when the inclination direction of the movement information input unit 21 is a diagonally-forward direction in starboard-side and the rudder angle of the turning information input unit 22 is zero (neutral), as illustrated in FIG. 9. Accordingly, a forward force Fx in the travel direction of the ship 1 is obtained. The larger the inclination angle data from the movement information input unit 21 is, the larger the magnitude of the forward force Fx is set.

At the same time, the first turning moment M1 generated by the port-side forward force Ta and the starboard-side backward force Tb is canceled by the second turning moment M2 generated by steering the port-side rudder 2b to port, and a lateral direction force Fy is obtained by the lateral direction force Fy generated by steering the port-side rudder 2b to port. Diagonally-forward control in starboard-side is performed by combining the lateral direction force Fy and the forward force Fx, which causes the ship 1 to transverse diagonally forward in starboard-side. In this case, the water current W generated by a port-side propulsion device 2a hits the rudder surface of the port-side rudder 2b which has been steered to port, and generates a rudder force having the component Fy in the starboard-side direction.

Figure 10:
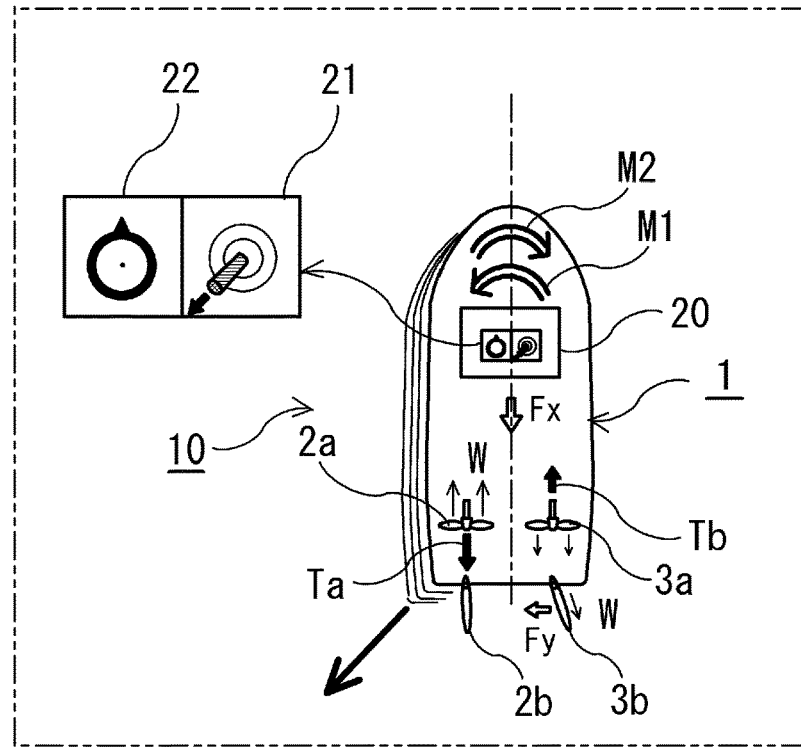
FIG. 10 is an explanatory diagram of diagonally-backward control in port-side.

Additionally, in the diagonally-backward control means 14, the diagonally-backward control means in port-side 14a makes the magnitude of a starboard-side forward force Tb generated by the starboard-side propulsion system 3 smaller than a magnitude of a port-side backward force Ta generated by a port-side propulsion system 2 when the inclination direction of the movement information input unit 21 is a diagonally-backward direction in port-side and the rudder angle of the turning information input unit 22 is zero (neutral), as illustrated in FIG. 10. Accordingly, a backward force Fx in the travel direction of the ship 1 is obtained. The larger the inclination angle data from the movement information input unit 21 is, the larger the magnitude of the backward force Fx is set.

At the same time, the first turning moment M1 generated by the port-side backward force Ta and the starboard-side forward force Tb is canceled by the second turning moment M2 generated by steering the starboard-side rudder 3b to starboard, and a lateral direction force Fy is obtained by the lateral direction force Y generated by steering the starboard-side rudder 3b to starboard. Diagonally-backward control in port-side is performed by combining the lateral direction force Fy and the backward force Fx, which causes the ship 1 to transverse diagonally backward in port-side. In this case, the water current W generated by the starboard-side propulsion device 3a hits the rudder surface of the starboard-side rudder 3b which has been steered to starboard, and generates the rudder force having the component Fy in the port-side direction.

Figure 11:
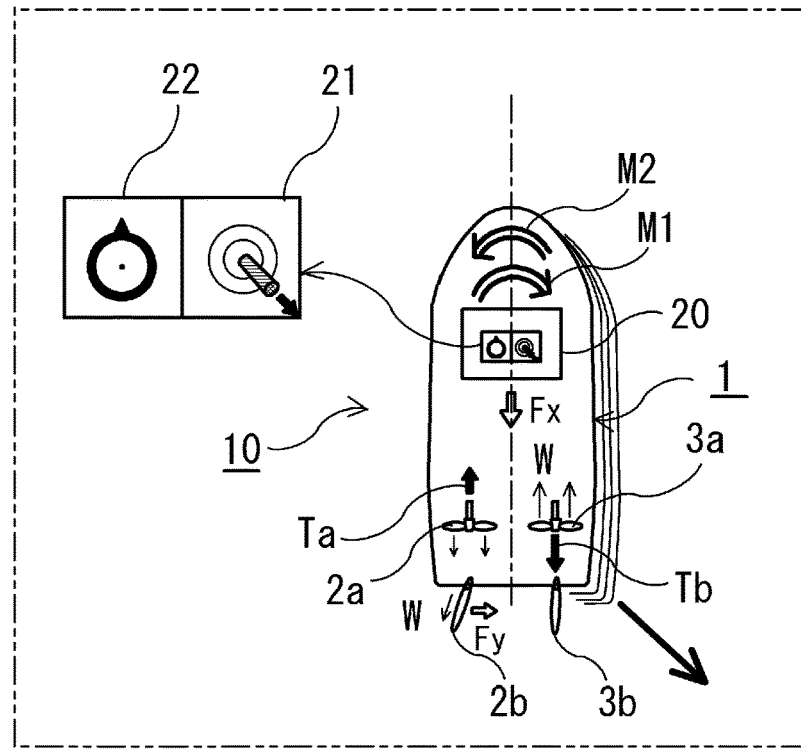
FIG. 11 is an explanatory diagram of diagonally-backward control in starboard-side.

In addition, the diagonally backward control means in starboard-side 14b makes the magnitude of the port-side forward force Ta generated by a port-side propulsion system 2 smaller than a magnitude of a starboard-side backward force Tb generated by the starboard-side propulsion system 3 when the inclination direction of the movement information input unit 21 is a diagonally-backward direction in starboard-side and the rudder angle of the turning information input unit 22 is zero (neutral), as illustrated in FIG. 11. Accordingly, a backward force Fx in the travel direction of the ship 1 is obtained. The larger the inclination angle data from the movement information input unit 21 is, the larger the magnitude of the backward force Fx is set.

At the same time, the first turning moment M1 generated by the port-side forward force Ta and the starboard-side backward force Tb is canceled by the second turning moment M2 generated by steering the port-side rudder 2b to port, and a lateral direction force Fy is obtained by the lateral direction force Y generated by steering the port-side rudder 2b to port. Diagonally backward control in starboard-side is performed by combining the lateral direction force Fy and the backward force Fx, which causes the ship 1 to transverse diagonally backward in starboard-side. In this case, the water current W generated by the port-side propulsion device 2a hits the rudder surface of the port-side rudder 2b which has been steered to port, and generates a rudder force having the component Fy in the starboard-side direction.

Figure 12:
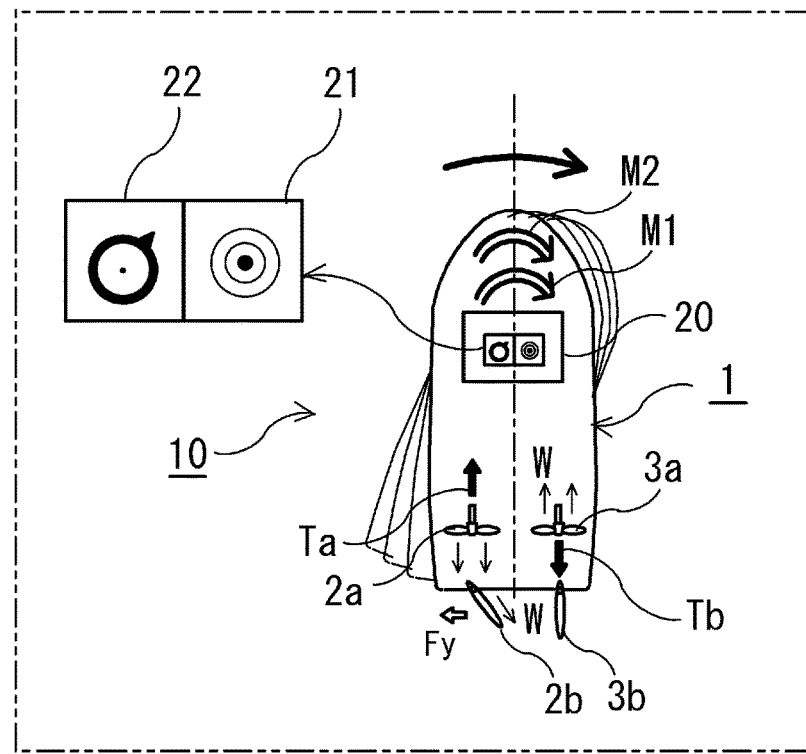
FIG. 12 is an explanatory diagram of pivot turning heading control in clockwise.

Additionally, in the pivot turning heading control means 15, the pivot turning heading control means in clockwise 15a equalizes the magnitude of the port-side backward force Ta generated by a port-side propulsion system 2 and the magnitude of the starboard-side forward force Tb generated by the starboard-side propulsion system 3 when the inclination direction of the movement information input unit 21 is zero (neutral) and the rudder angle of the turning information input unit 22 is an angle in the starboard-side direction, as illustrated in FIG. 12.

At the same time, the pivot turning heading control in clockwise is performed, which adds the second turning moment M2 generated by steering the port-side rudder 2b to starboard to the first turning moment M1 generated by the port-side backward force Ta and the starboard-side forward force Tb, so as to cause the ship 1 to turn round clockwise when seen from above. In this case, the water current W generated by a port-side propulsion device 2a hits the rudder surface of the port-side rudder 2b which has been steered to starboard, and generates a rudder force having the component Fy in the port-side direction. The larger the dial angle indicating the magnitude of the turning force from the turning information input unit 22, the larger the magnitude of the lateral direction force Fy is set.

Figure 13:
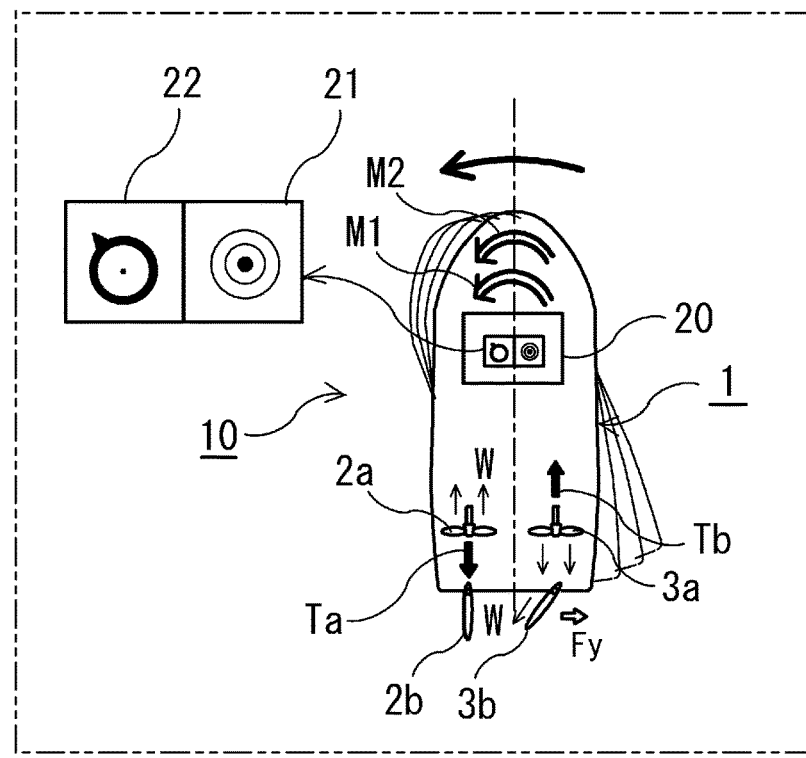
FIG. 13 is an explanatory diagram of pivot turning heading control in counterclockwise.

In addition, the pivot turning heading control means in counterclockwise 15b equalizes the magnitude of the port-side backward force Ta generated by a port-side propulsion system 2 and the magnitude of the starboard-side forward force Tb generated by the starboard-side propulsion system 3 when the inclination direction of the movement information input unit 21 is zero (neutral) and the rudder angle of the turning information input unit 22 is an angle in the port-side direction, as illustrated in FIG. 13.

At the same time, pivot turning heading control in counterclockwise is performed, which adds the second turning moment M2 generated by steering the starboard-side rudder 3b to port to the first turning moment M1 generated by the port-side backward force Ta and the starboard-side forward force Tb, so as to cause the ship 1 to turn round counterclockwise when seen from above. In this case, the water current W generated by the starboard-side propulsion device 3a hits the rudder surface of the starboard-side rudder 3b which has been steered to port, and generates a rudder force having the component Fy in the starboard-side direction. The larger the dial angle indicating the magnitude of the turning force from the turning information input unit 22, the larger the magnitude of the lateral direction force Fy is set.

In other words, with transverse control including transverse control in port-side, transverse control in starboard-side, diagonally-forward control in port-side, diagonally-forward control in starboard-side, diagonally-backward control in port-side, and diagonally-backward control in starboard-side, a propulsion force Fx in the travel direction of the ship 1 is obtained due to a difference between the backward force (Ta or Tb) of the propulsion system (2 or 3) on one broadside (port or starboard) and the forward force (Tb or Ta) of the propulsion system (3 or 2) on the other broadside (starboard or port).

At the same time, cancelling the first turning moment M1 in the turning direction (counterclockwise or clockwise) of the ship 1 generated by the backward force of the propulsion system on one broadside and a forward force of the propulsion system on the other broadside by the second turning moment M2 in the turning direction (clockwise or counterclockwise) of the ship 1 generated by steering the rudder (starboard-side rudder or port-side rudder) of the propulsion system on the other broadside causes the ship to move in one broadside direction by generating a lateral direction force Fy by the rudder on the other broadside while avoiding turning-round of the ship 1.

In addition, with pivot turning heading control including pivot turning heading control in clockwise and pivot turning heading control in counterclockwise, cancelling a backward force (Ta or Tb) of the propulsion system (2 or 3) on one broadside (port or starboard) by a forward force (Tb or Ta) of the propulsion system (3 or 2) on the other broadside (starboard or port) zeros out the propulsion force Fx in the travel direction of the ship 1.

At the same time, adding the second turning moment M2 in the turning direction (clockwise or counterclockwise) of the ship 1 generated by steering the rudder (port-side rudder or starboard-side rudder) of the propulsion system on one broadside to a first turning moment M1 in the turning direction (clockwise or counterclockwise) of the ship 1 generated by the backward force of the propulsion system on one broadside and the forward force of the propulsion system on the other broadside results in a turning-round moment (M1+M2) in the turning direction (clockwise or counterclockwise) of the ship 1, which causes the bow of the ship 1 to turn round toward the other broadside.

According to the aforementioned configurations, it is only necessary to steer the rudder 2b (3b) on one or the other broadside and keep the rudder 3b (2b) which is different from the former rudder 2b (3b) at counter rudder to perform transverse and pivot turning heading round, and thus parameters required for control turn out to be the propulsion forces Ta and Tb of the propulsion systems 2 and 3 on both broadsides, and the rudder angle of one rudder 2b (3b), whereby it becomes possible to maneuver the ship by relatively simple control. As a result, even when the ship does not have a bow thruster, a relatively simple maneuvering allows for transverse without turning round of the ship 1, or pivot turning heading round with neither forward nor backward, which realizes a significantly improved maneuverability, and makes automatic maneuvering for fixed-point position holding or position holding within a certain area significantly easy.

Figure 4:
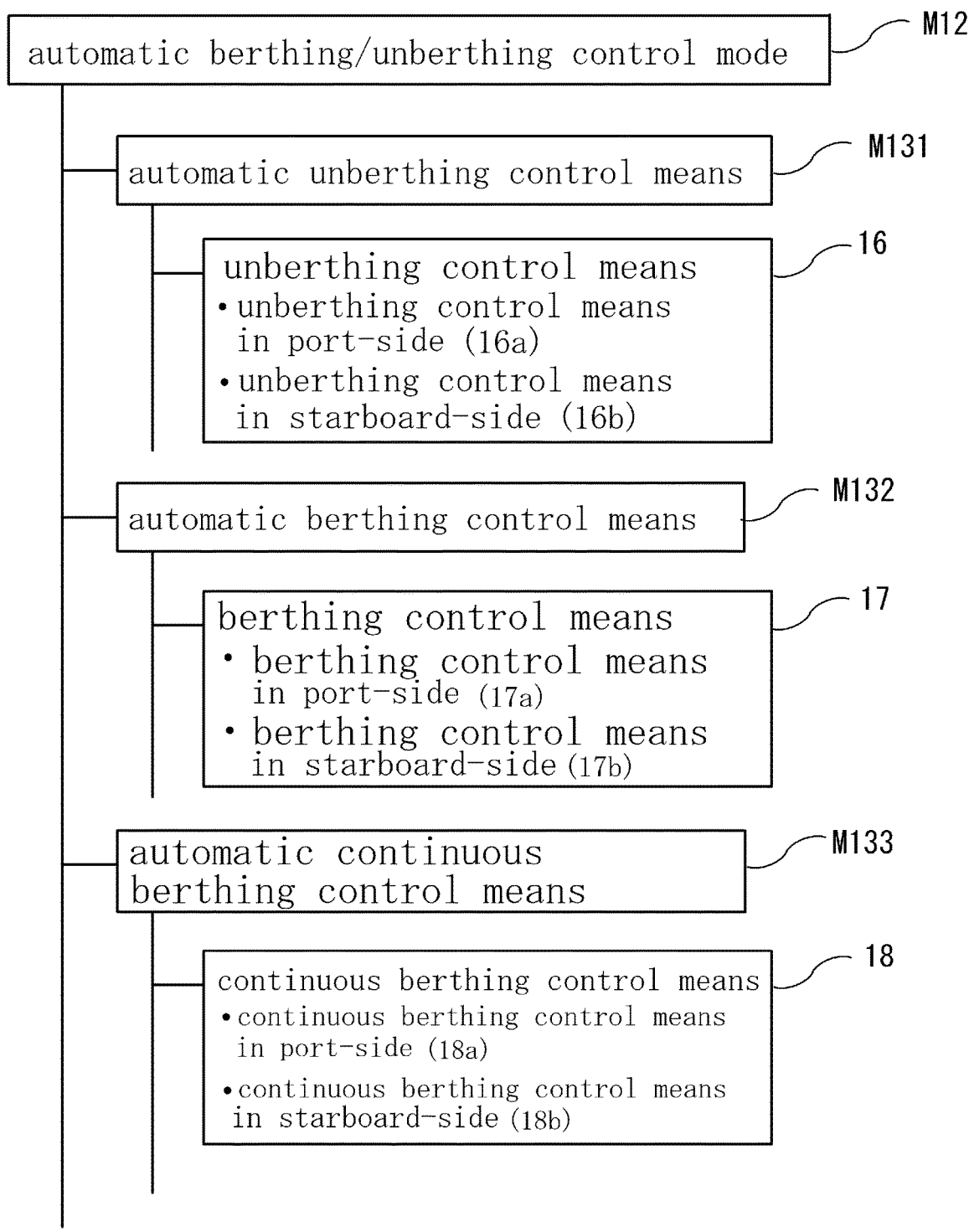
FIG. 4 illustrates a configuration of an automatic berthing/unberthing control mode of the ship maneuvering system.

Furthermore, as illustrated in FIG. 4, in the automatic berthing/unberthing control mode M13, an automatic unberthing control mode M131 is provided with an unberthing control means 16 including an unberthing control means in port-side 16a and an unberthing control means in starboard-side 16b, an automatic berthing control mode M132 is provided with a berthing control means 17 including a berthing control means in port-side 17a and a berthing control means in starboard-side 17b, and an automatic continuous berthing control mode M133 is provided with a continuous berthing control means 18 including a continuous berthing control means in port-side 18a and a continuous berthing control means in starboard-side 18b.

Figure 14:
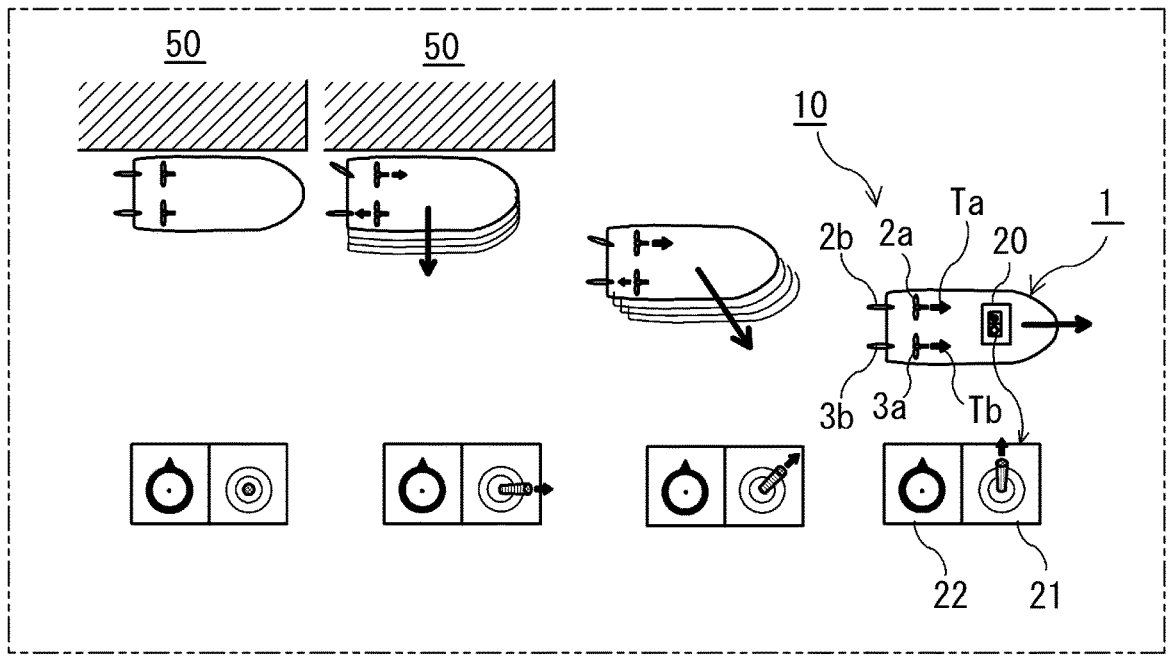
FIG. 14 is an explanatory diagram of unberthing control in port-side.
Figure 15:
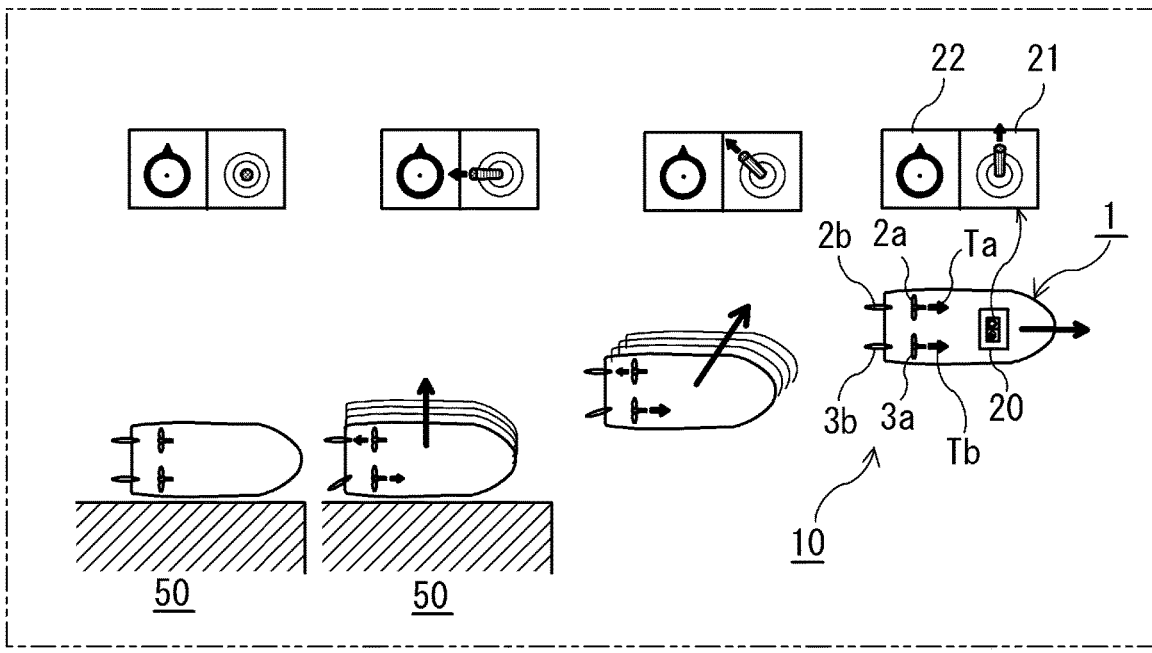
FIG. 15 is an explanatory diagram of unberthing control in starboard-side.

When using the automatic unberthing control mode M131, "automatic unberthing control mode" is selected via a switch or the like provided on the input device 20. The unberthing control means in port-side 16a of the unberthing control means 16 uses transverse control in starboard-side performed by the transverse control means in starboard-side 12b, or diagonally-forward control in starboard-side performed by the diagonally-forward control means in starboard-side 13b to automatically perform unberthing control in port-side for unberthing (or steering away) from a pier 50 (or mother ship) located at the port-side, as illustrated in FIG. 14. In addition, the unberthing control means in starboard-side 16b of the unberthing control means 16 uses transverse control in port-side performed by the transverse control means in port-side 12a, or diagonally-forward control in starboard-side performed by the diagonally-forward control means in starboard-side 13a to automatically perform unberthing control in starboard-side for unberthing (or steering away) from the pier 50 (or mother ship) located at the starboard-side, as illustrated in FIG. 15.

Accordingly, the unberthing control means in port-side 16a (or the unberthing control means in starboard-side 16b) of the unberthing control means 16 causes the ship 1 to advance and unberth the pier 50 in a manner such that, while calculating the distance in the forward direction and the unberthing distance between the broadside of the ship 1 and the pier 50, and calculating the speed of the ship 1 which is suitable for the distances, the ship 1 increases its speed to the calculated speed, and performs diagonally-forward transverse in starboard-side as illustrated in FIG. 14 to unberth the pier 50 located at the port-side. Alternatively, as illustrated in FIG. 15, the ship 1 performs diagonally-forward transverse in port-side to un-berth the pier 50 located at the starboard-side. Although not illustrated in particular, the same goes for when steering away from a mother ship instead of the pier 50.

Automatically performing the aforementioned maneuvering may be easily achieved by performing, by a skilled ship operator, unberthing operation (or steering away operation) of the ship 1 using the movement information input unit 21 and the turning information input unit 22 and storing data collected at the time, reproducing the data in the automatic unberthing control mode M131 when actually performing the unberthing operation, and furthermore, updating the data while learning from the situation at the time.

Figure 16:
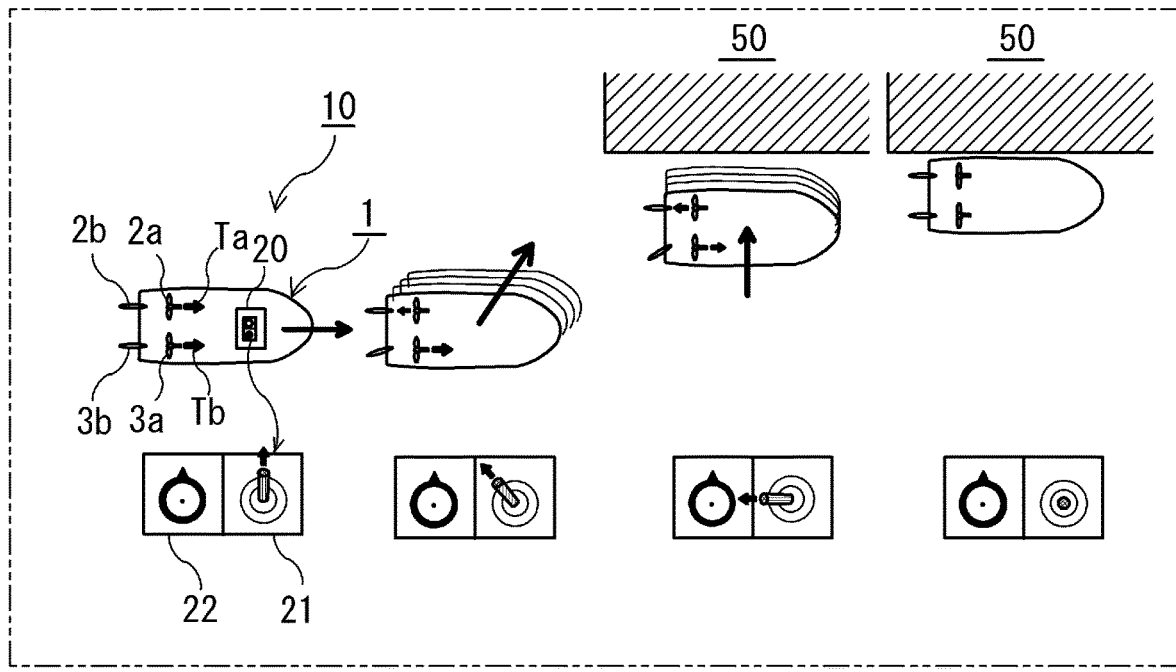
FIG. 16 is an explanatory diagram of berthing control in port-side.
Figure 17:
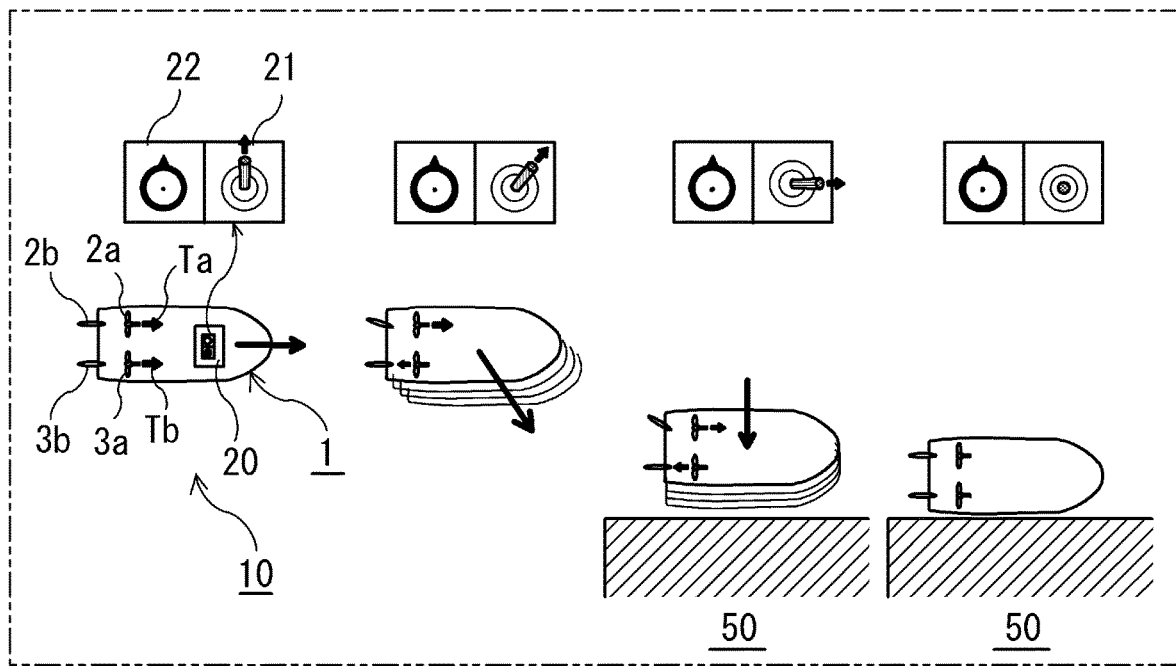
FIG. 17 is an explanatory diagram of berthing control in starboard-side.

Additionally, in the automatic berthing control mode M132, the berthing control means in port-side 17a of the berthing control means 17 uses diagonally-forward control in starboard-side performed by the diagonally-forward control means in starboard-side 13a, or transverse control in port-side performed by the transverse control means in port-side 12a to automatically perform berthing control in port-side for berthing (or approaching a ship) on the port-side, as illustrated in FIG. 16. In addition, the berthing control means in starboard-side 17b of the berthing control means 17 uses diagonally-forward control in starboard-side performed by the diagonally-forward control means in starboard-side 13b, or transverse control in starboard-side performed by the transverse control means in starboard-side 12b to automatically perform berthing control in starboard-side for berthing (or approaching a ship) on the starboard-side, as illustrated in FIG. 17.

When using the automatic berthing control mode M132, "automatic berthing control mode" is selected via the input device 20 in the vicinity of the pier 50, and the distance to the berthing spot of the pier 50 in the forward direction and the unberthing distance in the berthing direction (ship width direction) are input to the input device 20. The distance to the berthing spot in the forward direction and the distance in the berthing direction may be input, or imported from the position data of the own ship provided by GPS, and position data of the berthing spot.

While calculating the distance in the travel direction and the unberthing distance from the broadside, or alternatively performing measurement by a distance measurement device or the like, the ship 1 calculates the speed which has been preliminarily set via an experiment or the like, in accordance with the distance to the berthing spot, and, while decreasing to the speed, performs diagonally-forward transverse in port-side and transverse in port-side to berth on the pier 50 located at the port-side as illustrated in FIG. 16. Alternatively, as illustrated in FIG. 17, the ship 1 performs diagonally-forward transverse in starboard-side and transverse in starboard-side to berth on the pier 50 located at the starboard-side. The same goes for when approaching a mother ship instead of the pier 50.

Automatically performing the aforementioned maneuvering may be easily achieved by performing, by a skilled ship operator, berthing operation (or approaching operation) of the ship 1 using the movement information input unit 21 and the turning information input unit 22 and storing data collected at the time, reproducing the data in the automatic berthing control mode M132 when actually performing the berthing operation, and furthermore, updating the data while learning from the situation at the time.

Figure 18:
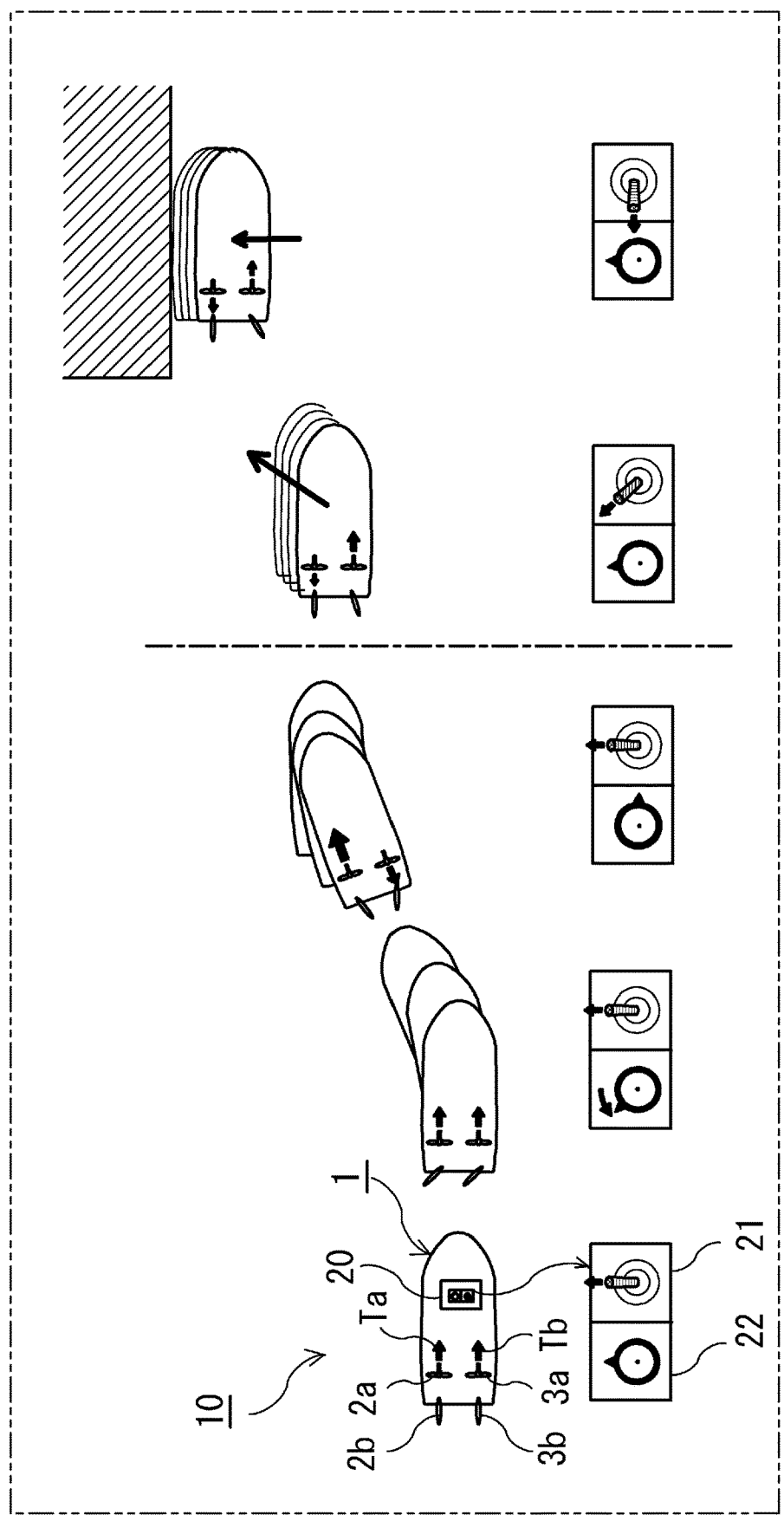
FIG. 18 is an explanatory diagram of continuous berthing control in port-side.

Additionally, in the automatic continuous berthing control mode M133, the continuous berthing control means in port-side means 18a of the continuous berthing control means 18 automatically switches to the "automatic berthing control mode", and uses the berthing control means in port-side 17a of the automatic berthing control mode M132 to automatically perform berthing, when the berthing distance reaches the preliminarily set distance automatically by a combination of forward advancing, forward left turning round, forward right turning round, or the like, via maneuvering of various well known ship maneuvering techniques of the ship maneuvering mode M11, as illustrated in FIG. 18.

Figure 19:
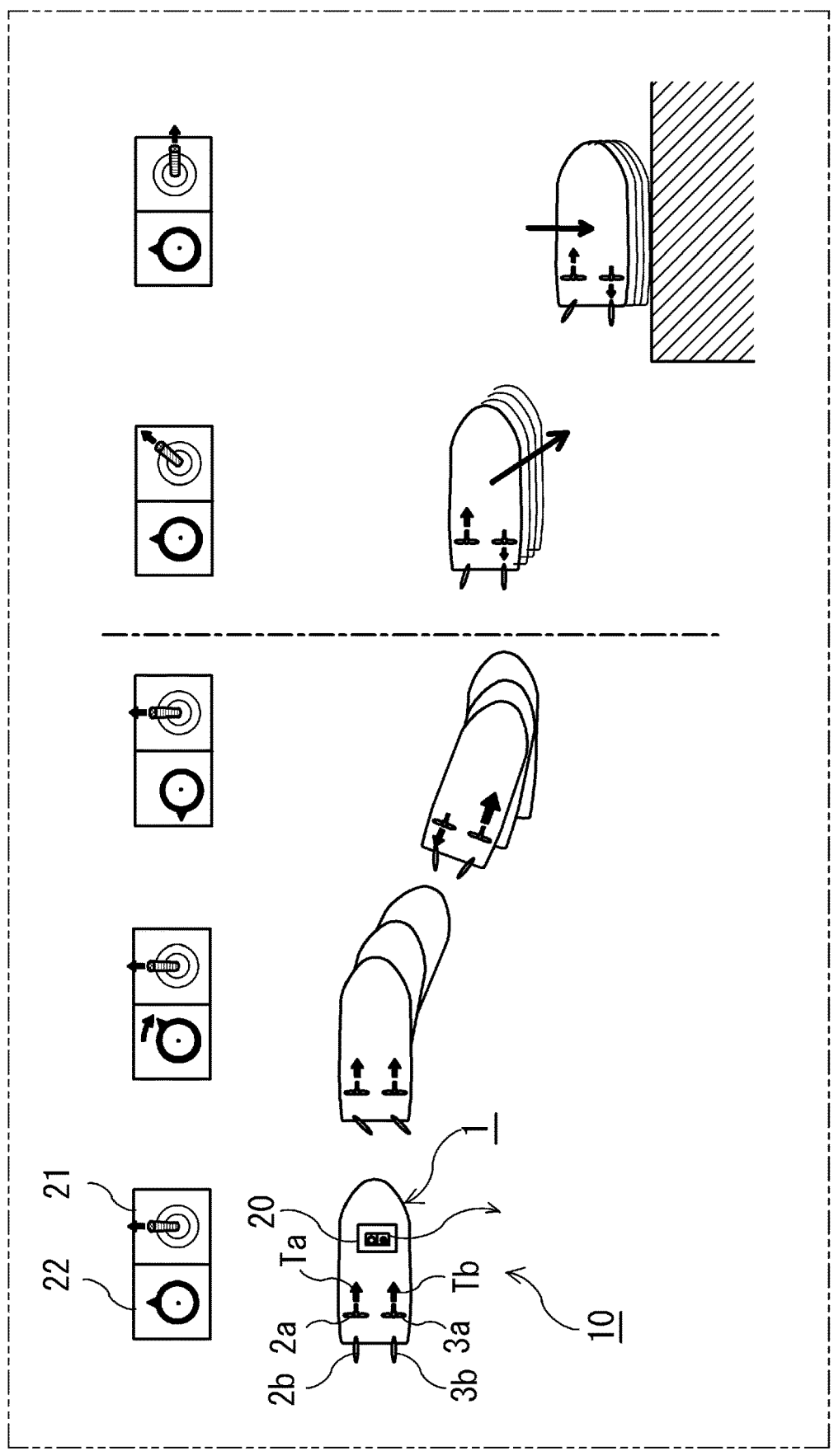
FIG. 19 is an explanatory diagram of continuous berthing control in starboard-side.

In addition, the continuous berthing control means in port-side 18b of the continuous berthing control means 18 automatically switches to the "automatic berthing control mode", and uses the berthing control means in port-side 17a of the automatic berthing control mode M132 to automatically perform berthing, when the berthing distance reaches the preliminarily set distance automatically by a combination of forward advancing, forward left turning round, forward right turning round, or the like, via maneuvering of various well known ship maneuvering techniques of the ship maneuvering mode M11, as illustrated in FIG. 19.

When using the continuous automatic berthing control mode M133, "automatic continuous berthing control mode" is selected via the input device 20 in the vicinity of the pier 50, and the distance to the berthing spot of the pier 50 in the forward direction and the un-berthing distance in the berthing direction (ship width direction) are input to the input device 20. The distance to the berthing spot in the forward direction and the distance in the berthing direction may be input, or imported from the position data of the own ship provided by GPS, and position data of the berthing spot.

While calculating the distance in the travel direction and the unberthing distance from the broadside, or alternatively performing measurement by a distance measurement device or the like, the ship 1 calculates the speed which has been preliminarily set via an experiment or the like, in accordance with the distance to the berthing spot, and, while decreasing to the speed, performs forward advancement, left turning round, and right turning round repeatedly as necessary, subsequently enters the "automatic berthing control mode", and finally berths on the pier 50 located at the port-side by diagonally-forward control in port-side and transverse control in port-side, as illustrated in FIG. 18. Alternatively, as illustrated in FIG. 19, the ship 1 performs forward advancement, right turning round, and left turning round repeatedly as necessary, subsequently enters the "automatic berthing control mode", and finally berths on the pier 50 located at the starboard-side by diagonally-forward control in starboard-side and transverse control in starboard-side. The same goes for when approaching a mother ship instead of the pier 50.

Automatically performing the aforementioned maneuvering may be easily achieved by performing, by a skilled ship operator, continuous berthing operation (or continuous approaching operation) of the ship 1 using the movement information input unit 21 and the turning information input unit 22 and storing data collected at the time, reproducing the data in the automatic continuous berthing control mode M133 when actually performing the berthing operation, and furthermore, updating the data while learning from the situation at the time.

In addition, the ship 1 of the embodiments of the present invention includes a ship maneuvering system 10. Therefore, the ship 1 may be maneuvered using the ship maneuvering system 10, which allows for implementing ship maneuvering with the ship maneuvering system 10.

Therefore, according to the ship maneuvering system 10, the ship 1, and the ship maneuvering method of the present invention, a high maneuverability is exhibited by a relatively easy maneuvering operation input to the maneuvering system 10 of the ship 1 having the two propulsion systems 2 and 3, of the port-side propulsion system 2 including the port-side propulsion device 2a and the port-side rudder 2b and the starboard-side propulsion system 3 including the starboard-side propulsion device 3s and the starboard-side rudder 3b, at its stern.

REFERENCE SIGNS LIST 1 ship
2 port-side propulsion system
2a port-side propulsion device
2b starboard-side propulsion device
3 starboard-side propulsion system
3a port-side rudder
3b starboard-side rudder
10 ship maneuvering system
11 longitudinal control means
12 transverse control means
12a transverse control means in port-side
12b transverse control means in starboard-side
13 diagonally-forward control means
13a diagonally-forward control means in port-side
13b diagonally-forward control means in starboard-side
14 diagonally-backward control means
14a diagonally-backward control means in port-side
14b diagonally-backward control means in starboard-side 15 pivot turning heading control means
15a pivot turning heading control means in clockwise
15b pivot turning heading control means in counterclockwise
16 unberthing control means
16a unberthing control means in port-side
16b unberthing control means in starboard-side
17 berthing control means
17a berthing control means in port-side
17b berthing control means in starboard-side
18 continuous berthing control means
18a continuous berthing control means in port-side
18b continuous berthing control means in starboard-side
20 input device
21 movement information input unit (joy-stick)
22 turning information input unit (dial)
30 maneuvering control device
Fx propulsion force (forward force, backward force) of ship
Fy lateral direction force
M11 ship maneuvering mode
M12 berthing/unberthing control mode
M13 automatic berthing/unberthing control mode
M131 automatic unberthing control mod
M132 automatic berthing control mode
M133 automatic continuous berthing control mode
Ta advancing force (forward force, backward force) of port-side propulsion system
Tb advancing force (forward force, backward force) of starboard-side propulsion system

The invention claimed is:

1. A maneuvering system of a ship having a portside propulsion system including a port-side propulsion device and a port-side rudder and a starboard-side propulsion system including a starboard-side propulsion device and a starboard-side rudder, at its stern,
the ship maneuvering system comprising a maneuvering control device configured to perform transverse control and pivot turning heading control independently, and including a movement information input unit which is a joy-stick type that only performs transverse control, and a turning information unit which is a dial type that only performs turning heading control;
wherein said transverse control functions to obtain propulsive force in the longitudinal direction of the ship due to a difference between a backward force of the propulsion system on one broadside and a forward force of the propulsion system on another broadside, and move the ship to the direction of said one broadside, while avoiding turning round of the ship, by cancelling a first turning moment in a turning direction of the ship generated by a backward force of the propulsion system of said one broadside and a forward force of the propulsion system on another broadside, by a second turning moment in a turning direction of the ship generated by steering the rudder of the propulsion system on said another broadside; and
wherein said pivot turning heading control functions to zero out a propulsive force in the longitudinal direction of the ship due to cancelling a backward force of the propulsion system on one broadside by a forward force of the propulsion system on another broadside, and also obtain a turning-round moment of the ship in a turning direction by adding a second turning moment in a turning direction of the ship generated by steering the rudder of the propulsion system on said another broadside to a first turning moment in the turning direction of the ship generated by the backward force of the propulsion system of said one broadside and a forward force of the propulsion system on said another broadside, so as to cause a bow of the ship to turn heading on the spot to the direction of said one broadside.

2. The ship maneuvering system according to claim 1,
herein said maneuvering control device is configured to perform transverse control in portside, and transverse control means in starboard-side,
wherein said transverse control in port-side carries out to equalize a magnitude of a port-side backward force generated by said port-side propulsion system and a magnitude of a starboard-side forward force generated by said starboard-side propulsion system, and also cancel a first turning moment generated by a port-side backward force and a starboard-side forward force by a second turning moment generated by steering said starboard-side rudder to starboard, so as to cause the ship to translate in the port-side direction by a lateral direction force generated by steering said starboard side rudder to starboard; and
wherein transverse control means in starboard-side carries out to equalize a magnitude of a port-side forward force generated by said port-side propulsion system and a magnitude of a starboard-side backward force generated by said starboard-side propulsion system, and also cancel a first turning moment generated by a port-side forward force and a starboard-side backward force by a second turning moment generated by steering said port-side rudder to port, so as to cause the ship to translate in the starboard-side direction by a lateral direction force generated by steering said portside rudder to port.

3. The ship maneuvering system according to claim 1,
wherein said maneuvering control device is configured to perform diagonally-forward control in port-side and diagonally-forward control in starboard-side,
wherein said diagonally-forward control in port-side carries out to make a magnitude of a starboard-side forward force generated by said starboard-side propulsion system larger than a magnitude of a port-side backward force generated by said port-side propulsion system, and also cancel a first turning moment generated by said port-side backward force and said starboard-side forward force by a second turning moment generated by steering said starboard-side rudder to starboard, so as to cause the ship to transverse diagonally forward in starboard-side by a lateral direction force generated by steering said starboard-side rudder to starboard; and
wherein said diagonally-forward control in starboard-side carries out to make a magnitude of a port-side forward force generated by said port-side propulsion system larger than a magnitude of a starboard-side backward force generated by said starboard-side propulsion system, and also cancel a first turning moment generated by a port-side forward force and a starboard-side backward force by a second turning moment generated by steering said port-side rudder to port, so as to cause the ship to transverse diagonally forward in starboard-side by a lateral direction force generated by steering said port-side rudder to port.

4. The ship maneuvering system according to claim 1,
wherein said maneuvering control device is configured to perform diagonally-forward control in port-side and diagonally-forward control in starboard-side, wherein said diagonally-backward control in port-side carried out to make a magnitude of a starboard-side forward force generated by said starboard-side propulsion system smaller than a magnitude of a port-side backward force generated by said port-side propulsion system, and also cancel a first turning moment generated by a port-side backward force and a starboard-side forward force by a second turning moment generated by steering said starboard-side rudder to starboard, so as to cause the ship to transverse diagonally backward in port-side by a lateral direction force generated by steering said starboard-side rudder to starboard; and wherein said diagonally-forward control in starboard-side carried out to make a magnitude of a port-side forward force generated by said port-side propulsion system smaller than a magnitude of a starboard-side backward force generated by said starboard-side propulsion system, and also cancel a first turning moment generated by a port-side forward force and a starboard-side backward force by a second turning moment generated by steering said port-side rudder to port, so as to cause the ship to transverse diagonally backward in starboard-side by a lateral direction force generated by steering said port-side rudder to port.

5. The ship maneuvering systems according to claim 1, wherein said maneuvering control device is configured to perform pivot turning heading control in clockwise and pivot turning heading control in counterclockwise, wherein said pivot turning heading control in clockwise carries out to equalize a magnitude of a port-side backward force generated by said port-side propulsion system and a magnitude of a starboard-side forward force generated by said starboard-side propulsion system, and also adds a second turning moment generated by steering said starboard-side rudder to port to a first turning moment generated by a port-side backward force and a starboard-side forward force, so as to cause the ship to turn around counterclockwise when seen from above; and wherein said pivot turning heading control in counterclockwise carries out to equalize a magnitude of a port-side forward force generated by said port-side propulsion system and a magnitude of a starboard-side backward force generated by said starboard-side propulsion system, and also adds a second turning moment generated by steering said port-side rudder to starboard to a first turning moment generated by a port-side backward force and a starboard-side forward force, so as to cause the ship to turn around clockwise when seen from above.

6. The ship maneuvering system according to claim 1, wherein said maneuvering control device has an automatic berthing control mode which automatically performs one or all of: unberthing control in port-side to perform unberthing or steering away from a ship at the port-side; un-berthing control to perform unberthing in starboard-side or steering away from a ship at the starboard-side; berthing control in port-side to perform berthing or approaching a ship at the port-side; or berthing control in starboard-side to perform berthing or approaching a ship at the starboard-side, using at least one of said transverse control or said pivot turning heading control.

7. The ship maneuvering system according to claim 1, wherein said maneuvering control device is configured to: in a case where an input to said turning information input unit is neutral;

cause the ship to move in a port-side direction without turning round when an input to said movement information input unit indicates the port-side direction;

cause the ship to move diagonally forward in port-side without turning round when an input to said movement information input unit indicates diagonally forward in port-side;

cause the ship to move left diagonally backward without turning round when an input to said movement information input unit indicates left diagonally backward;

cause the ship to move in a starboard-side direction without turning round when an input to said movement information input unit indicates the starboard-side direction;

cause the ship to move diagonally forward in starboard-side without turning round when an input to said movement information input unit indicates diagonally forward in starboard-side; and cause the ship to move right diagonally backward without turning round when an input to said movement information input unit indicates right diagonally backward.

8. The ship maneuvering system according to claim 1, wherein said maneuvering control device is configured to:

in a case where an input to said movement information input unit is neutral, cause the ship to perform pivot turning heading in clockwise round without forward or backward movement when an input to said turning information input unit indicates the starboard-side direction; and cause the ship to perform pivot turning heading in counterclockwise round without forward or backward movement when an input to said turning information input unit indicates the port-side direction.

9. A ship comprising the ship maneuvering system according to claim 1.

10. A maneuvering method of a ship having two propulsion systems of a port-side propulsion system including a port-side propulsion device and a port-side rudder and a starboard-side propulsion system including a starboard-side propulsion device and a starboard-side rudder, at its stern, the ship maneuvering system comprising a maneuvering control device configured to perform transverse control and pivot turning heading control independently, and including a movement information input unit which is a joy-stick type that only performs transverse control, and a turning information unit which is a dial type that only performs turning head control, the method performing at least one of:

obtaining a propulsive force in the longitudinal direction of the ship due to a difference between a backward force of the propulsion system on one broadside and a forward force of the propulsion system on another broadside, and moving the ship to the direction of said one broadside, while avoiding turning round of the ship, by cancelling a first turning moment in a turning direction of the ship generated by a backward force of the propulsion system of said one broadside and a forward force of the propulsion system on another broadside, by a second turning moment in a turning direction of the ship generated by steering the rudder of the propulsion system on said another broadside; and zeroing out a propulsive force in the longitudinal direction of the ship due to cancelling a backward force of the propulsion system on one broadside by a forward force of the propulsion system on another broadside, and also obtaining a turning-round moment of the ship in a turning direction by adding a second turning moment in a turning direction of the ship generated by steering the rudder of the propulsion system on said another broadside to a first turning moment in the turning direction of the ship generated by the backward force of the propulsion system of said one broadside and a forward force of the propulsion system on said another broadside, so as to cause bow of the ship to turn on the spot to the direction of said one broadside.

\* \* \* \* \*